United States Patent
Tanaka et al.

[19]

[11] Patent Number: 5,153,799
[45] Date of Patent: Oct. 6, 1992

[54] MAGNETIC TAPE CASSETTE HAVING BRIDGED GUIDE RIBS

[75] Inventors: Kimio Tanaka; Shinichi Sato; Takateru Sato, all of Saku, Japan

[73] Assignee: TDK Corporation, Tokyo, Japan

[21] Appl. No.: 744,665

[22] Filed: Aug. 9, 1991

Related U.S. Application Data

[63] Continuation of Ser. No. 477,315, Feb. 8, 1990, abandoned.

[30] Foreign Application Priority Data

Feb. 10, 1989 [JP] Japan ................................ 1-14094[U]

[51] Int. Cl.[5] ................. G11B 23/087; G11B 15/60; B29B 7/00
[52] U.S. Cl. .................................... 360/132; 242/199; 264/328.12; 360/130.21
[58] Field of Search .................. 360/132, 130.21; 242/199; 264/328

[56] References Cited

U.S. PATENT DOCUMENTS

| | | | |
|---|---|---|---|
| Re. 32,447 | 6/1987 | Geraldi et al. ................ | 242/199 |
| 4,166,593 | 9/1979 | Milants ......................... | 242/199 |
| 4,745,508 | 5/1988 | Tollefson ....................... | 360/132 |
| 4,748,529 | 5/1988 | Shiba et al. ................... | 360/132 |
| 4,766,511 | 8/1988 | Miyoshi et al. ................ | 360/132 |
| 4,791,503 | 12/1988 | Yamamoto et al. ............ | 360/132 |
| 4,939,613 | 7/1990 | Flores, Jr. et al. ............ | 360/132 |
| 5,003,425 | 3/1991 | Ozawa ........................... | 242/199 |

Primary Examiner—John H. Wolff
Assistant Examiner—Craig A. Renner
Attorney, Agent, or Firm—Wood, Phillips, VanSanten, Hoffmann & Ertel

[57] ABSTRACT

A magnetic tape cassette has in the front portion of the housing two pairs of fixed tape guide ribs protruding the same length frontwardly of the housing to define a guide path for the magnetic tape and also protruding so as to form linear front edges of a height greater than the width of the tape, the fixed tape guide ribs in at least one pair being formed adjacent to each other, with the upper and lower ends of the protruding front edges being integrally joined by bridges of the same material. The bridges are formed to have a given, constant width and a given, constant height upwardly and downwardly.

3 Claims, 4 Drawing Sheets

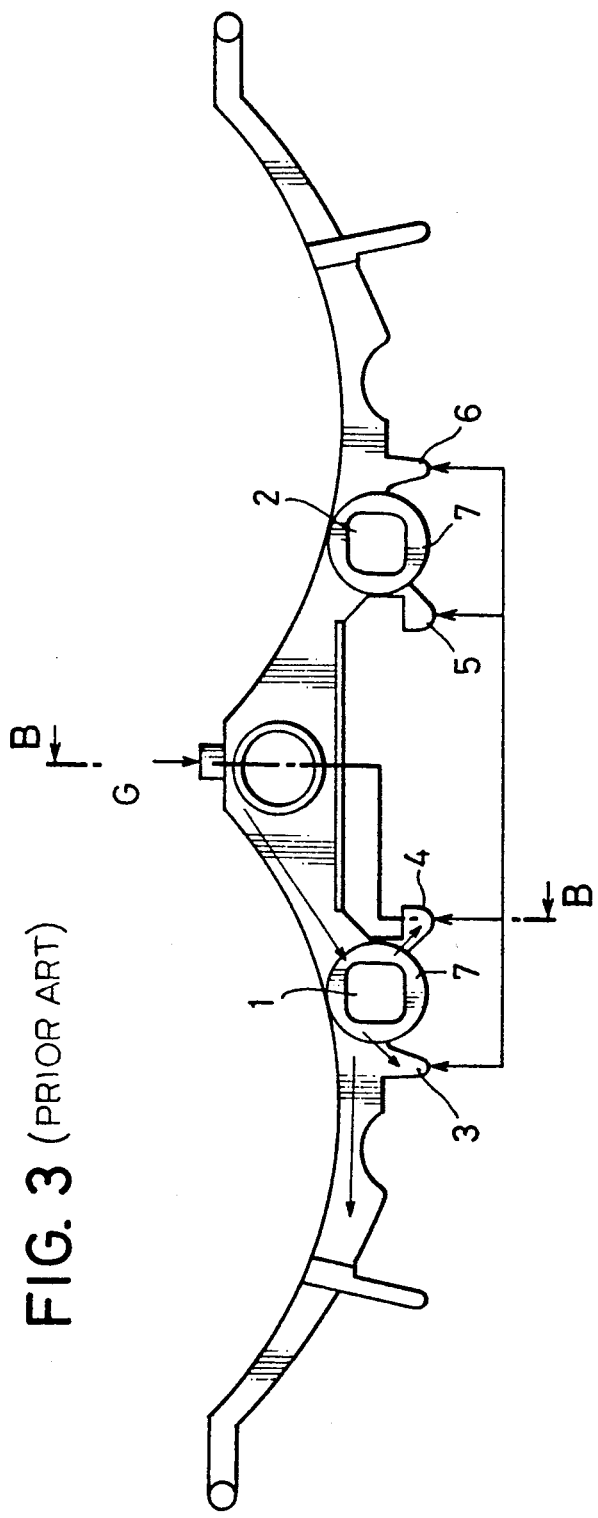
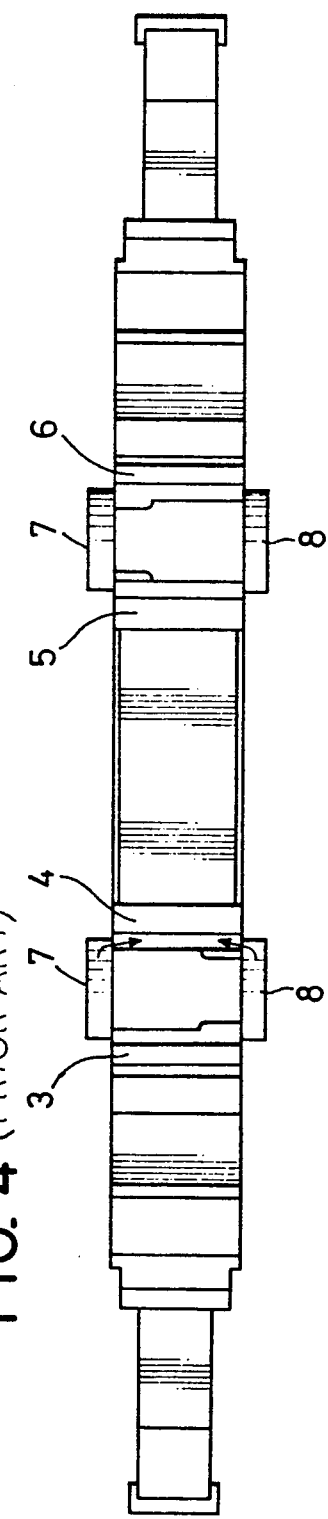
FIG. 3 (PRIOR ART)
FIG. 4 (PRIOR ART)

MAGNETIC TAPE CASSETTE HAVING BRIDGED GUIDE RIBS

This application is a continuation of application Ser. No. 477,315, filed Feb. 8, 1990 now abandoned.

BACKGROUND OF THE INVENTION

This invention relates to a magnetic tape cassette, and more specifically to a magnetic tape cassette having improved tape guides.

Throughout this specification, the orientation of a conventional magnetic cassette as well as that of the present invention will be named on an assumption that the cassette which comprises a pair of flat half parts is placed horizontally and the side of the cassette where the magnetic tape is exposed will be called the "front portion". Thus, the upper one of the half parts will be called the "upper part" and the lower one of the half parts will be called the "lower part".

A magnetic tape cassette is an enclosure generally comprising a housing which consists of a set of upper and lower half parts, a pair of tape-winding hubs accommodated in the housing, and a length of magnetic tape wound round the hubs so that it can be unwound from one hub and taken up by the other, an vice versa, passing the front portion of the housing. To allow the magnetic tape to run uniformly in close contact with the magnetic head of a recorder, various guide rollers and fixed guide ribs are provided in the front portion of the housing. Of those, fixed tape guides are the subject of improvements in accordance with the present invention.

In FIGS. 1 and 2 are shown conventional fixed tape guide ribs provided in the front portion of a magnetic tape cassette. For the convenience of explanation the upper and lower half parts of the housing are not shown. To guide a magnetic tape properly, the conventional arrangement includes two pairs of guide ribs 3, 4 and 5, 6, protruding frontwardly of the housing, respectively, from recesses 1, 2 which are aligned to reference openings 12, 13 formed in the upper and lower half parts of the housing to control the cassette position relative to the recorder. (Refer to FIG. 5.) These ribs are upright in parallel with the surface of the magnetic tape T, with a height greater than the width of the tape. The plane connecting the ridges (straight front edges) of the guide ribs 3, 4, 5, 6 constitutes a plane that defines a path for the magnetic tape.

In plastic molding of the casing, molten resin is poured into the mold cavity at the gate G until the resin flow comes to an end at the points where guide ribs are to be formed. At the end points the resin frequently is not thoroughly filled up, leaving bubbles in the molded part of causing discoloration (reflecting the reaction of monomer in the resin) due to insufficient degassing. These bubbles, in turn, can impair the outward appearance of the finished article or produce dimensional accuracy falling short of design requirements.

In another example of the prior art, as shown in FIGS. 3 and 4, rings 7, 8 are provided around the upper and lower ends, respectively, of reference openings 1, 2 and are integrally fixed to guide ribs 3, 4 and 5, 6. These rings are primarily intended, after precision finish, for alignment with the corresponding openings of the upper and lower half parts of the housing, to serve as dimensional standards for other components and for the recorder to handle the cassette. In the example being described, too, the front edges of the guide ribs 3, 4, 5, 6 are the points where molten resin finally reaches during the molding. This combines with the relatively narrow width often to interrupt the resin flow and cause inadequate resin flow, again presenting the aforesaid problems typified by malformation (shown exaggerated) along the front edges of the ribs 3, 4, 5, 6 as shown for the rib 4 in FIG. 10.

SUMMARY OF THE INVENTION

It is therefore an object of the present invention to provide, in a magnetic tape cassette of the type having fixed tape guide ribs formed in the front portion, an arrangement whereby such fixed tape guide ribs are free from bubbles or which undergo no discoloration.

Another object of the invention is to provide fixed tape guide ribs capable also of serving as dimensional standards.

To realized the objects, the invention provides a magnetic tape cassette including a housing of upper and lower half parts, a pair of tape-winding hubs contained in the housing, and a length of magnetic tape wound round the hubs to run from hub to hub past fixed tape guide ribs in the front portion of the housing, characterized in that the fixed tape guide ribs protrude the same length frontwardly of the housing to define a guide path for the magnetic tape and also protrude so as to form linear front edges of a height greater than the width of the tape, said fixed tape guide ribs in at least one pair being formed adjacent to each other, with the upper and lower ends of the protruding front edges being integrally joined by bridges of the same material. Preferably the bridges are formed to have a given, constant width and a given, constant height upwardly and downwardly to provide dimensional standards with respect to the upper and lower half housing parts.

According to this invention, the bridges furnish reliefs for molten resin during the molding so as to form fixed guide ribs of high precision free from bubbles of discoloration, and the bridges can also be used as dimensional standards to enhance the overall dimensional accuracy of the cassette.

BRIEF DESCRIPTION OF THE DRAWINGS

FIG. 3 is a plan view similar to FIG. 1 but of another cassette of the prior art;

FIG. 4 is a front view of FIG. 3;

DESCRIPTION OF THE PREFERRED EMBODIMENT

Figure 1:
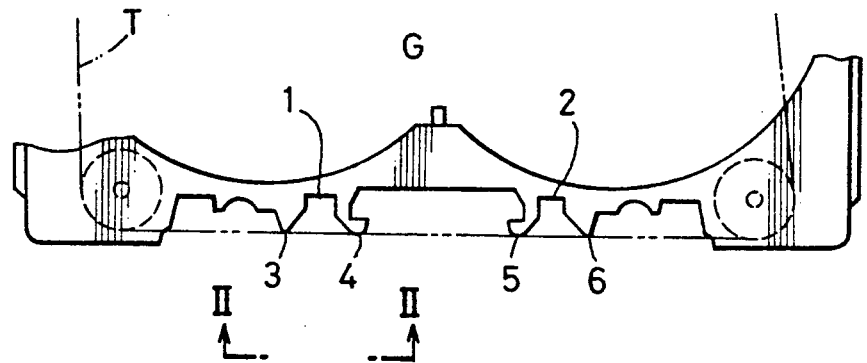
FIG. 1 is a plan view of the front portion of a conventional magnetic tape cassette, with the upper and lower half parts of the housing removed.
Figure 2:
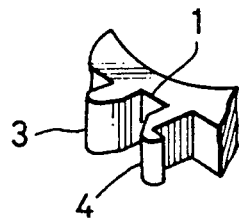
FIG. 2 is a perspective view of the section II—II of FIG. 1.
Figure 5:
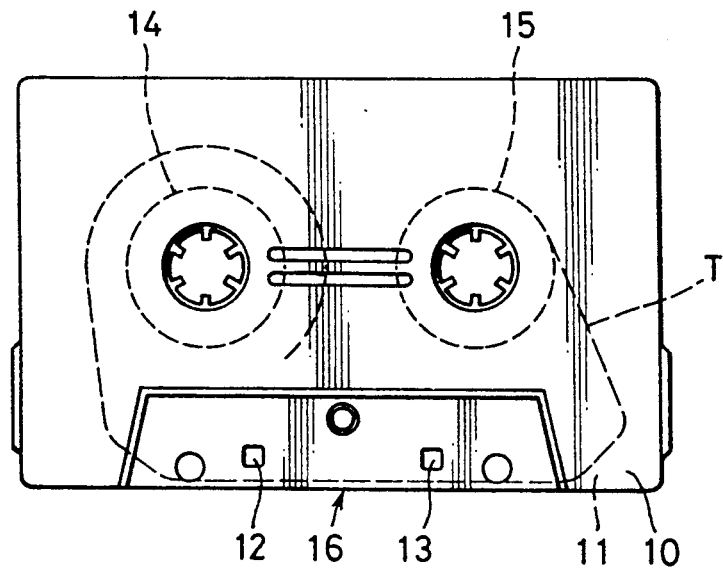
FIG. 5 is a plan view of a magnetic tape cassette which incorporates the present invention.
Figure 6:
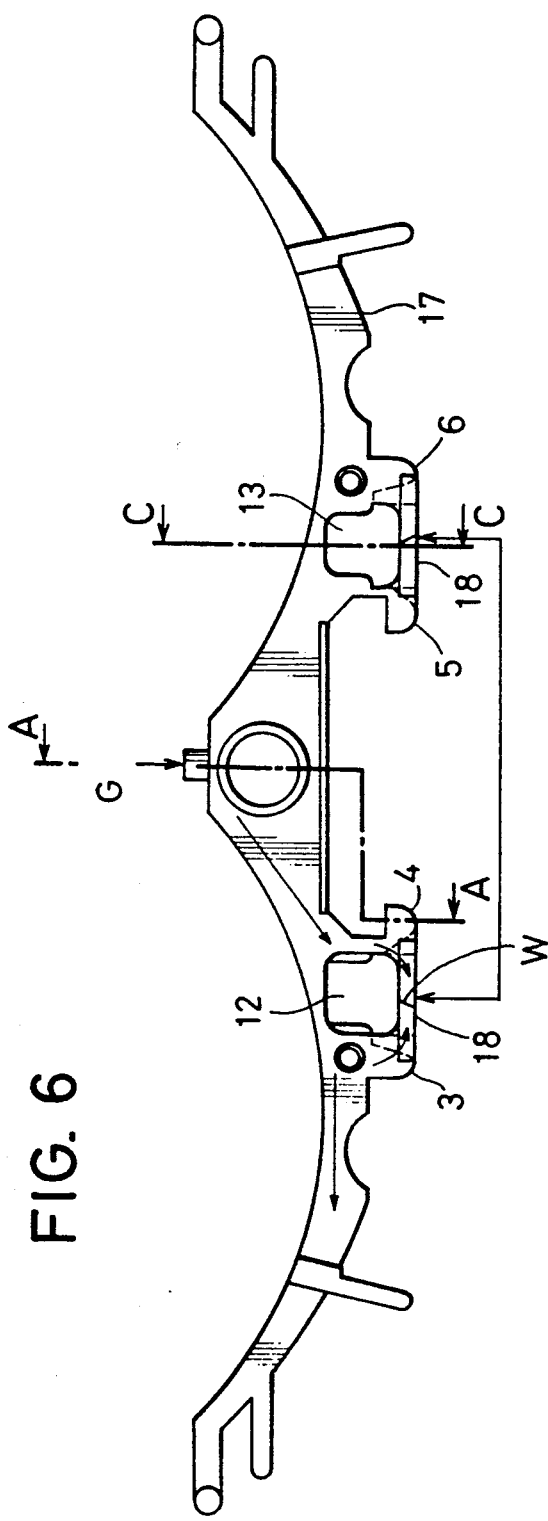
FIG. 6 is a plan view of the front portion of a magnetic tape cassette formed with fixed tape guide ribs in accordance with the invention, with the upper and lower half parts of the housing removed.
Figure 7:
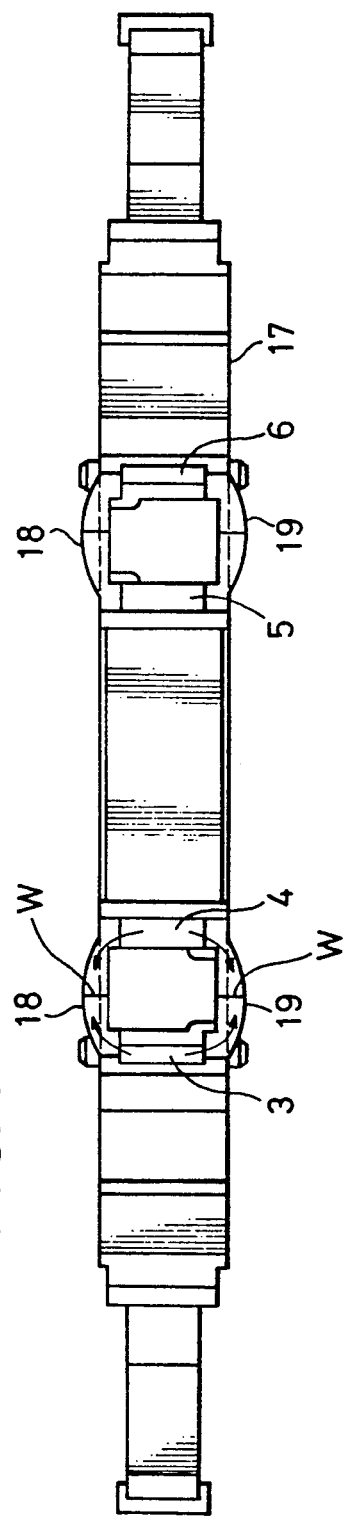
FIG. 7 is a front view of the same portion.
Figure 8:
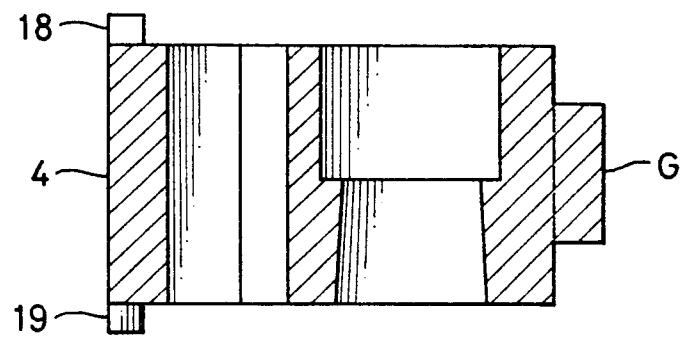
FIGS. 8 and 9 are sectional views taken, respectively, along the lines A-13 A and C—C of FIG. 6.
Figure 9:
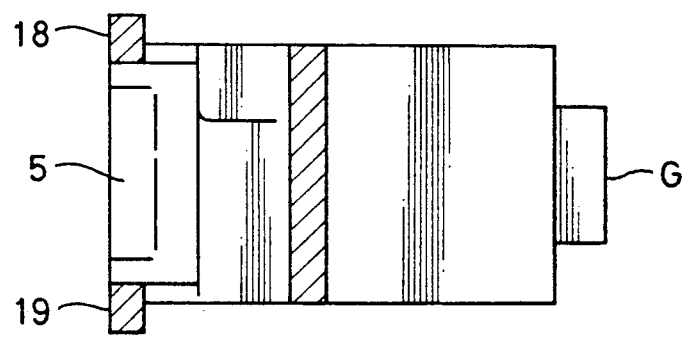
Figure 10:
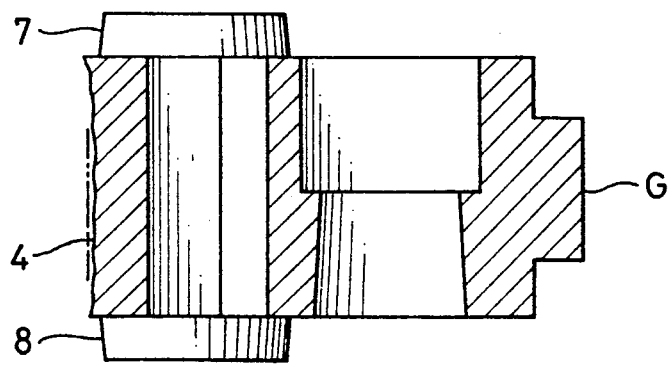
FIG. 10 is a sectional view taken along the line B—B of FIG. 3.

Referring now to FIG. 5, there is shown a general view of a magnetic tape cassette which incorporates the present invention. The cassette comprises upper and lower half housing parts 10, 11, a pair of rotatable hubs 14, 15 on which a length of magnetic tape T is wound, and a front portion 16 including various guide means. The magnetic tape T is caused to run past the front portion 16 by the guide means.

FIGS. 6 to 9 are enlarged views of the front portion, with the upper and lower half housing parts eliminated. Like conventional portions, it is provided with two pairs of tape guides or guide ribs 3, 4 and 5, 6 which protrude from both sides of the reference openings 12, 13 to the same plane at the front of the frame 17 of the front portion, until they end with linear front edges. These guide ribs are formed in one piece with the frame 17 by plastic molding. In addition, according to the present invention, pairs of upper and lower bridges 18, 18 and 19, 19 having an arched top and bottom contour, respectively, each join the upper and lower ends of the linear front edges of the pairs of ribs 3, 4 and 5, 6, respectively. These bridges 18, 19 preferably have a given, constant width and protrude to a given, constant height upwardly and downwardly from the upper and lower faces of the frame 17 so as to provide dimensional standards. In the embodiment being described, the bridges each have an arcuate outer surface.

The structure described above makes it possible, at the time of injection molding a plastic material into a mold cavity, for the molten resin introduced at the gate G to flow in the directions of the arrows, filling up the voids to form guide ribs 3, 4, 5, 6 and, with the aid of the voids, to thereby form bridges 18, 19 that serve as reliefs. The last filled voids form the bridges which terminate at weld lines w. Consequently, the molten resin can solidify uniformly in the guide ribs, thus providing ribs of high dimensional accuracy without bubbles or discoloration.

What is claimed is:

1. A magnetic tape cassette of a type including a housing of a pair of generally flat half parts, a pair of tape-winding hubs contained in the housing, a length of magnetic tape wound round the hubs to run from hub to hub past a plurality of fixed tape guide ribs protruded from a front portion member located along one side of the housing where the magnetic tape is exposed, said guide ribs protruding toward the magnetic tape and ending in edges in a common plane to define a guide path for the magnetic tape, each of said edges having a length larger than a width of said magnetic tape, characterized in that at least one pair of said guide ribs are closely adjacent, and the edges of said pair of guide ribs are integrally connected by means for bridging said guide ribs at both ends of said edges in said common plane defining said guide path for the magnetic tape, said bridging means accommodating flow of a molding material from said pair of guide ribs to only form a terminal point at a location intermediate said pair of guide ribs in each of said bridging means.

2. A magnetic tape cassette according to claim 1 wherein said bridging means are bulged upwardly and downwardly at an intermediate point along each of said bridging means.

3. A magnetic tape cassette according to claim 1 wherein said front portion member has an injection molding gate generally centered on a side spaced from said guide ribs.

* * * * *